United States Patent [19]

De Cenzo

[11] 4,438,958
[45] Mar. 27, 1984

[54] CLAM-SHELL COUPLING FOR JOINING BEADED TUBES

[76] Inventor: Herbert A. De Cenzo, 3917 Cannon Ave., Las Vegas, Nev. 89121

[21] Appl. No.: 345,551

[22] Filed: Feb. 4, 1982

Related U.S. Application Data

[62] Division of Ser. No. 112,956, Jan. 17, 1980.

[51] Int. Cl.³ .............................................. F16L 21/06
[52] U.S. Cl. ..................................... 285/234; 285/45; 285/81; 285/87; 285/373; 285/409; 174/94 S; 339/14 R; 339/15
[58] Field of Search ................. 285/373, 233, 234, 45, 285/409, 81, 87; 174/94 S; 339/14 R, 15

[56] References Cited

U.S. PATENT DOCUMENTS

| | | | |
|---|---|---|---|
| 1,649,752 | 11/1927 | Stone | 285/373 X |
| 2,417,741 | 3/1947 | Dillon | 285/373 |
| 2,913,262 | 11/1959 | De Cenzo et al. | 285/333 |
| 3,116,078 | 12/1963 | Scherer | 285/373 X |
| 4,008,937 | 2/1977 | Filippi | 285/233 |

FOREIGN PATENT DOCUMENTS

| | | | |
|---|---|---|---|
| 531558 | 8/1955 | Italy | 285/373 |
| 790109 | 2/1958 | United Kingdom | 285/373 |

*Primary Examiner*—Dave W. Arola
*Attorney, Agent, or Firm*—William H. Maxwell

[57] ABSTRACT

A split coupling of clam-shell configuration applied laterally over abutted ends of confronting tube sections with bead-over-wire reinforcement engaged with opposed shoulders of separable body members, and having depressible ring and abutment seals molded into the separable body members hinged for abutment a diametrical axially disposed plane coincidental with the axis of the body members when closed over said confronting tube sections by link and latch means, all basic structural members operating in tension and shear connections multiplied for greater strength and for uniform load distribution, said ring seals being scarfed for circumferential continuity, and there being an electrical bond between the coupling and said confronting tube sections.

21 Claims, 24 Drawing Figures

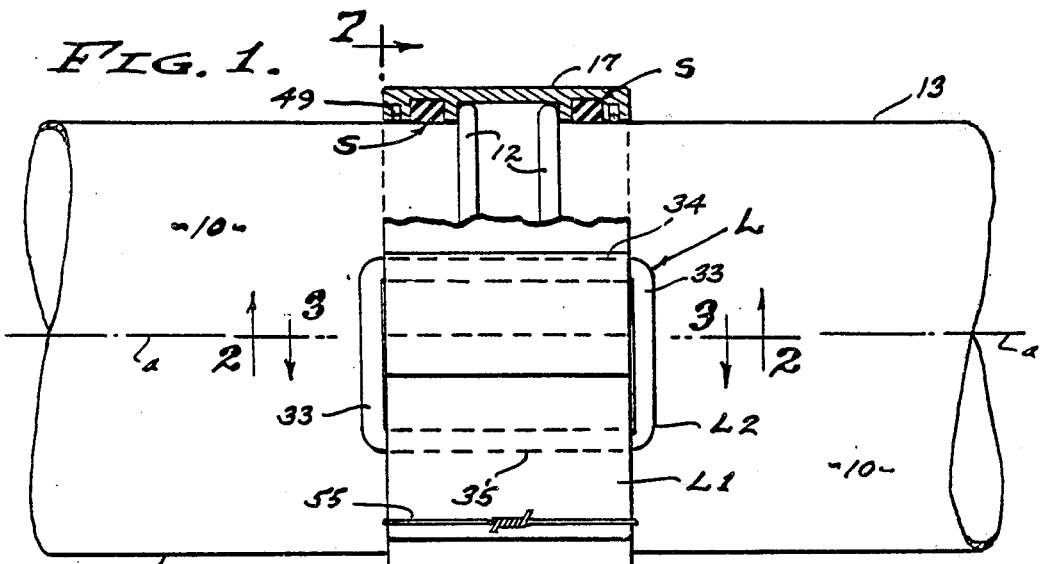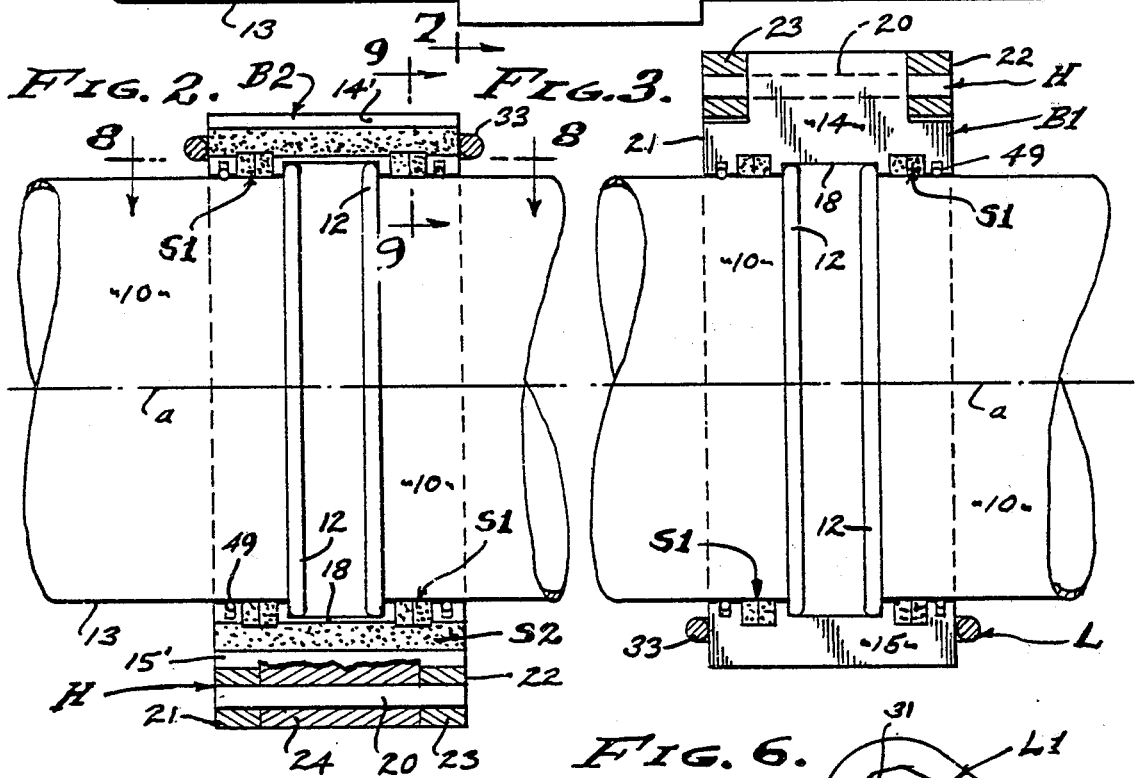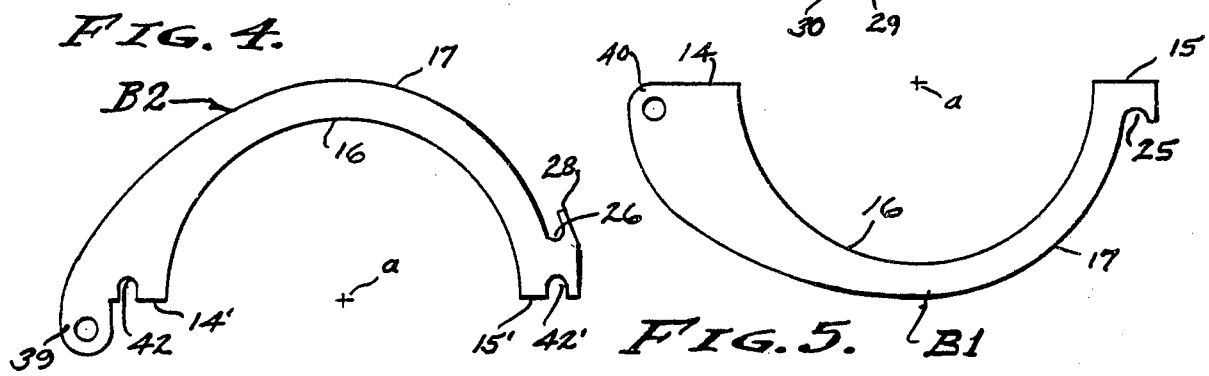

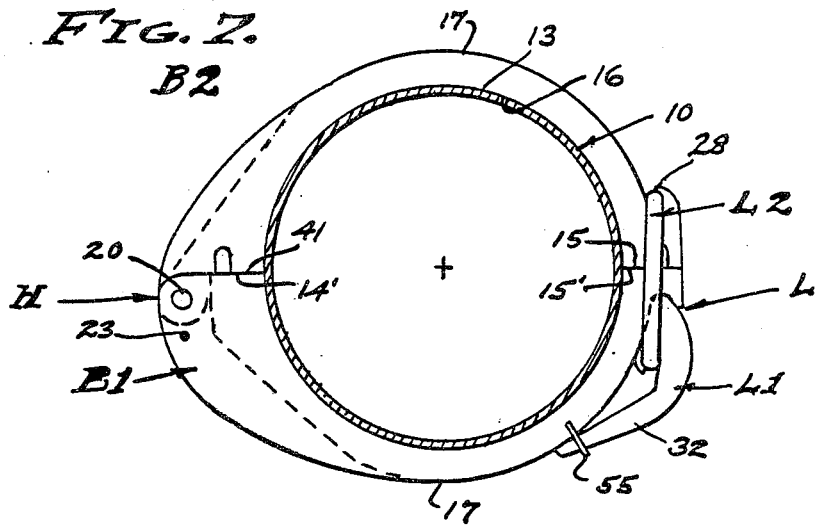
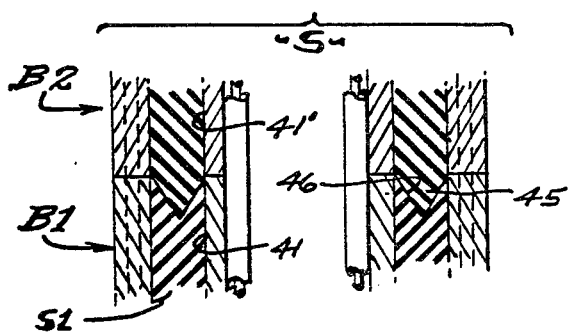
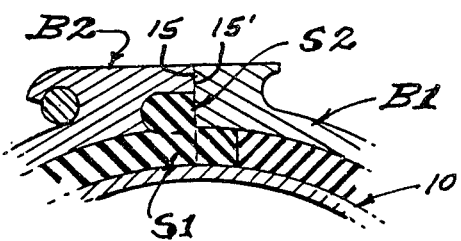
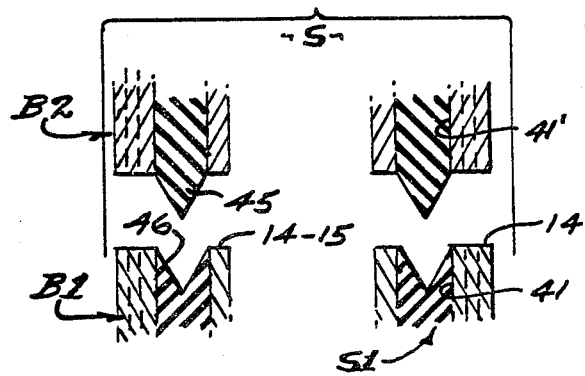
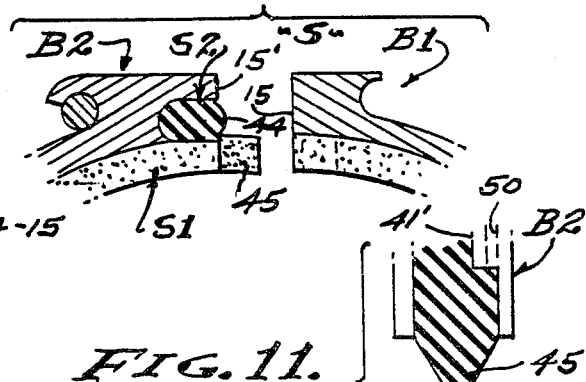
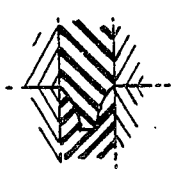

CLAM-SHELL COUPLING FOR JOINING BEADED TUBES

This is a division of copending application Ser. No. 112,956, filed Jan. 17, 1980, entitled CLAM-SHELL COUPLING FOR JOINING BEADED TUBES.

BACKGROUND

This invention relates to fluid line couplings and the like for aircraft in particular, where fluid tightness must be maintained while lightness is required and with subjection to flexing and the application of substantial pressure differentials. Reference is made to Letters Patent of the U.S. Pat. No. 2,913,262 wherein a split coupling is disclosed but which did not become commercially successful, as it leaked even under ideal conditions. It is a general object, therefore, to improve upon this patented coupling in which I am co-inventor, and to provide a coupling body with seals that endure fluid tightness and a body that is stressed so as to eliminate distortion within the fluid pressure range to be encountered.

The conditions in which this coupling is used involves confronting tubular members that are to be coupled through the lateral application thereto of a so-called "Split Coupling", herein referred to as a "Clam-Shell Coupling". Couplings of the type under condideration are characterized by mating halves that embrace the opposed ends of confronting tube sections. The seals are also split and carried by the two body halves of the coupling to embrace the opposed tube ends. Elastomer seals therefor have been employed and fabricated as separate replaceable members with compressible interfaces intended to seal. However, the slightest deformation of the body members together with the primitive seal interface designs resulted in leakage. Therefore, it is an object of this invention to (1) provide body members in a configuration what virtually eliminates distortion thereof; and (2) provide seal interengagement wherein the interfaces overlap in a manner to ensure fluid tightness.

Split couplings of the type under consideration have body members that fit together at a diametrically disposed plane of separation. This is also true of the present coupling wherein flat interfaces of the body halves engage one with the other. An object therefore, is to provide a seal configuration conducive to an ensured fluid tightness at diametrically separable interfaces. It is the sealing members herein which project from one or more of the body members and which are overlapped and/or scarfed to have a "chevron" interengagement or the equivalent thereof.

Heretofore, split coupling body members have been subjected to bending stresses with resultant deflection under load, and obviously mechanical and hydraulic failure likely. However, it is an object of this invention to eliminate bending of the coupling body members and to apply tension stresses exclusively. With the present invention greater reliability is achieved, as the coupling body members are essentially hoop-stressed as they are constricted together over the confronting tube sections.

In addition to the elimination of bending stresses and replacement thereof with tension stress application to the coupling body members the said body members are latched with the application of shear stress, it being and object of this invention to augment shear capability so as to strengthen the coupling. It is to be understood that combined stresses are involved. With the present invention, both the hinge and the latch-link for joining the body halves are of multi-shear configuration which multiplies the strength thereof accordingly while distributing the said tension stresses equally over or through the body members. Only a portion of the latch is in compression, and not a critical stress application.

The coupling herein disclosed is a flexible coupling, in that the confronting tube sections are permitted to be displaced a minimum of 4° out of axial alignment with the axis of the closed coupling. To this end it is an object of this invention to provide radial clearance occupied by a reliable annular seal that conforms to the exterior diameter of the tube sections respectively. With the present invention circular integrity of the seal is ensured by the inclusion therein of scarfed overlapping rather than primitive abutted interfacing. Essentially a compressed tongue and groove interengagement, whereby all interstices are occupied by the elastomer of the seal. Accordingly, circular continuity of the seal embracing the tube end is established.

Uniformity of the confronting tube cross sections is essential to a fluid tight connection, and to this end it is an object of this invention to provide reinforcement at each confronting tube end. Heretofore, rolled beads of semi circular arcuate cross sections have been employed as they are disclosed in U.S. Pat. No. 2,913,202; but not so with the present invention wherein an improved "bead-over-wire" reinforcement is employed. This bead-over-wire reinforcement not only makes the tube stiffer but also prevents collapse or crushing, as it eliminates the ramp effect to which the simple prior art bead is subject. Note that force application is normal to this bead-over-wire abutment, at the tangent point of engagement; therefore force application is axial.

Electrical bonding is requirement of tube couplings, and to this end it is an object to provide an improved brush contact between the coupling bodies and outer diameters of the confronting tube ends. The brush of the present invention can vary in configuration, being carried in a groove provided exclusively therefor. A feature of said brush is its circular embracement of the tubing to be bonded, in one form a serpentine wire and in another form a circular pack of radial bristles; in each instance crimped or cemented into the accommodating groove.

It is an object herein to provide the complete coupling having the features hereinabove referred to, in a commercially practical form comprised of the fewest number of members and parts that are not only reliable but conducive to inexpensive fabrication. It is an object to employ extruded body half sections, as well as extruded latch and link members; all of which are subject to simple and accurate machine operations for their completion as operable parts. Accordingly, unnecessary material is removed for lightness, and sized configurations and tolerances established with known and readily applicable machine tools and methods. The seals as later described are molded in place and bonded into the channels provided for their incorporation into the body sections.

SUMMARY OF INVENTION

The clam-shell coupling herein disclosed is characterized by separable body sections adapted to be applied laterally over confronting tube ends that are beaded for engagement therewith. The tube ends are reinforced by a bead-over-wire configuration that bears axially against opposed shoulders established by two semi circular body members. Axially outward of each shoulder there is a circular seal depressibly engageable with the outer diameter of the confronting tube sections. The seal rings are comprised of semicircular members molded into their respective semicircular grooves machined into the complementary body members. The ring seals at opposite ends of the coupling are also integrally joined with abutment seals at the interfaces between the mated body members. The integral ring and abutment seals are made of an elastomer or the like, impervious to the fluid conducted by the tubing, there being scarfed joinder thereof circumferentially of the coupling joint; when closed. The body members articulate about a hinge so as to be closed into abutted interface engagement on a diametrical plane disposed axially coincidental with the central axis of the coupling. Securement in a working condition is by means of an over-center link and latch means, and in the preferred form of this invention the hinge and link and latch means are bifurcated so as to interengage with a multiplicity of shear planes thereby increasing strength with equal distribution of load. The coupling is electrically bonded to the confronting tube sections, preferably by bristles that preclude the entry of debris. And, secondary lock means is provided to ensure latching by preventing unintentional release.

The foregoing and other various objects and features of this invention will be apparent and fully understood from the following detailed description of the typical preferred form and applications thereof, throughout which description reference is made to the accompanying drawings.

DESCRIPTION OF THE DRAWINGS

FIG. 1 is a side view of a coupling embodying the present invention and broken away to show joining confronting tube sections.

FIGS. 2 and 3 are sectional views taken as indicated by lines 2—2 and 3—3 on FIG. 1.

FIGS. 4, 5 and 6 are views showing the separate cross sectional configurations of each of the basic extrusions employed in the coupling of FIGS. 1 through 3.

FIG. 7 is a sectional view taken as indicated by line 7—7 on FIG. 1.

FIGS. 8 and 9 are enlarged detailed sectional views taken as indicated by lines 8—8 and 9—9 on FIG. 2 and showing the coupling seals closed; and FIGS. 8a and 9a are exploded views similar to FIGS. 8 and 9 respectively and showing the coupling seals separated.

FIG. 10 illustrates three additional embodiments (a, b and c) of the circumferential seal;

FIG. 11 illustrating a fourth embodiment wherein the seal is of enlarged configuration.

PREFERRED EMBODIMENT

Figure 12:
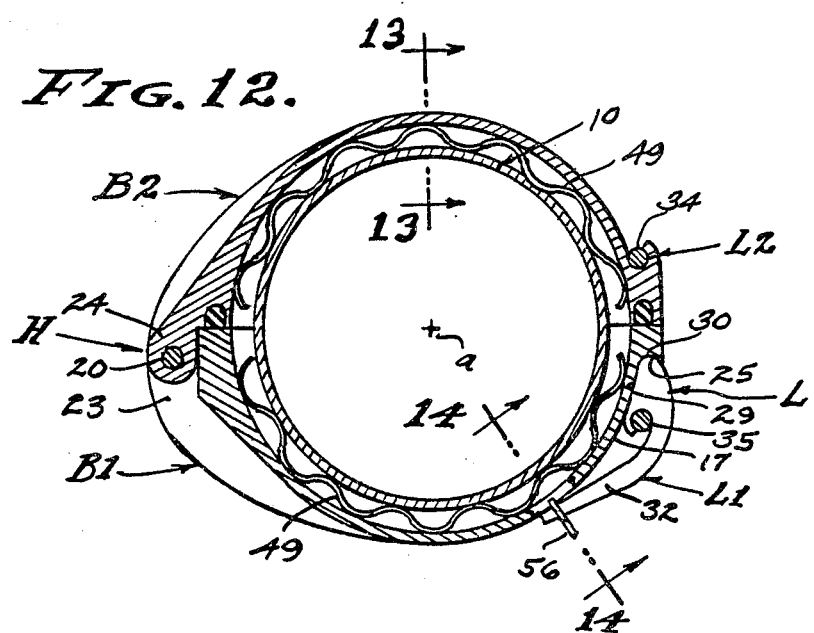
FIG. 12 is a view similar to FIG. 7, illustrating the electrical bond with the tubing.

Referring now to the drawings, it is the end of a beaded tube section 10 that is to be engaged by this coupling, and most often it is the confronting and opposed ends of a pair of beaded tube sections 10 that are to be engaged and coupled thereby. As illustrated herein, the coupling is laterally applicable to confronting tube sections that are externally beaded for interengagement by means of inwardly opposed shoulders presented by separable body members of the coupling. In accordance with this invention, the tubing to be connected is thin walled aluminum, for example 6061 alloy in the T4 condition. A feature is the bead-over-wire (ring) configuration of the tube end formation, wherein circular ring 11 of round cross section, of aluminum or the like, is engaged over the end portion of the tube end about which the end of said tube is formed, as by rolling 270° (or more) as shown. The bead 12 and internal wire ring 11 circumferentially reinforces the tube end disposed normal to the axis of the tube. The tube 10, ring 11 and reinforcing bead 12 are of complementary round configuration, for example the bead extending radially 0.060 inch from 2 inch tube having 0.030 inch wall thickness formed over 0.060 wire. It is to be understood however, that this coupling can be used with other bead forms including beaded sleeves (not shown) swedged over the tube ends.

Figure 18:
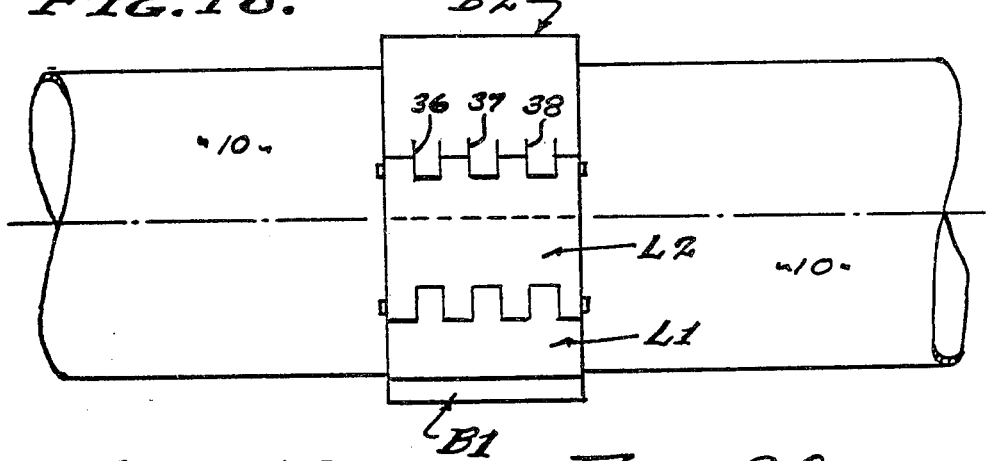
FIG. 18 is a view similar to FIG. 1 showing the second embodiment coupling in its closed condition. and, FIGS. 19 through 22 are views showing the separate cross sectional configurations of each of the basic extrusions employed in the coupling FIGS. 16 through 18.
Figure 19:
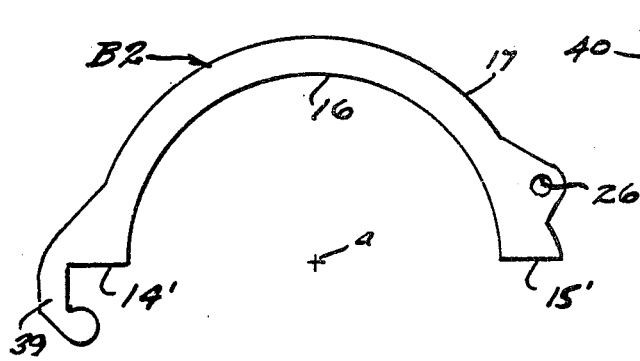
Figure 20:
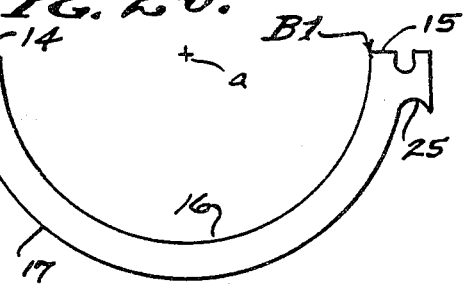
Figure 21:
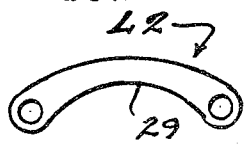
Figure 22:
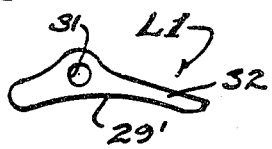

Two forms of clam-shell coupling are disclosed herein, the form of FIG. 1 with a simple hinge and linklatch means, and the form of FIG. 18 with the improved hinge means and link means. In either form the separable body members B1 and B2 are in tension and the hinge means and latch means are in tension with shear connections. The seal means S is the same in each form, and the electrical bond means and secondary lock means as they are later described are applicable to either form.

It is the lateral application of separable body members and complementary seals over the opposed ends of confronting tube sections with which this invention is concerned, with the objective to reliably seal on a diametrical plane coincidental with the central axis of the coupling, while the confronting tube sections are permitted to missalign axially within a certain limit. In practice, the axial missalignment is more or less 4° per tube, or 8° between a pair of confronting tubes. In carrying out this invention as it is disclosed herein, the coupling body members B1 and B2 and the hinge and latch members are all metallic and for example fabricated of aluminum extrusion, as will be described. However, this clam-shell coupling can also be fabricated of other materials such as pressure molded plastic.

The separable body members of the coupling are semi-circular in form each being of a half-shell configuration and adapted to embrace one side of the tube end to be coupled. Accordingly, there are mating body members B1 and B2 formed about a common central axis a and characterized by abutting faces in a diametrical plane disposed coincidental with said axis a. The base member B1 has diametrically disposed opposite faces 14 and 15 while cover member B2 has a complementary and diametrically disposed opposite faces 14' and 15'. As shown, faces 14 and 14' and faces 15 and 15' have interface engagement when the mating members B1 and B2 are brought together into working position to present a circular bore 16 therethrough. It is the bore 16 that engages over the outer diameter 13 of the tubing 10, with clearance sufficient to permit the aforesaid 4° axial missalignment. The outer wall 17 is more or less concentric with axis a and modified as will be described to form the hinge and latch configurations.

The body member half-shells are initially extruded as shown in FIGS. 4 and 5 for the embodiment shown in FIGS. 1 through 12; establishing the bore and outer wall configurations and some of the hinge and latch features. A feature of the finished and mated body members B1 and B2 is the interior counterbore 18 that presents inwardly opposed shoulders 19 with adequate space therebetween to accommodate the beads of two confronting tube sections while permitting a minimum of ¼ inch axial movement and said 4° missalignment thereof. The shoulders 19 are disposed normal to the axis a so as to engage tangentially with the 270° turn of the bead 12, thereby transfering axial forces between the coupling bodies and the tubes.

Referring now to the hinge means H, base extrusion B1 is enlarged at face 14 to extend radially for the reception of a pivot pin 20 offset outward from the plane of separation and toward the crown of said member B1. In practice, the enlargement is removed between opposite end faces 21 and 22, leaving ears 23 to receive the pivot pin 20. The cover extrusion B2 is provided with a complementary enlargement at face 14' to extend radially for the reception of pivot pin 20, in this case offset inward from the plane of separation and toward the crown of said member B2. In practice, the opposite end portions of this enlargement are removed at end faces 21 and 22, leaving a finger 24 engageable between the ears 23 and to receive the pivot pin 20. The shoulders 19 of the two members B1 and B2 are aligned by the engagement of finger 24 between ears 23, and the offset placement of pivot pin 20 facilitates machining of the longitudinal seal grooves later described.

Referring now to latch means L, the base and cover extrusions are both enlarged at faces 15 and 15' to provide an anchor seat 25 and a fulcrum seat 26 respectively, both of which are offset outward from the plane of separation and toward the crown of the body member of which they are a part. The seats 25 and 26 are half round and of concaved form extending longitudinally of the body members B1 and B2 and each tangent with the outer wall 17 thereof. The anchor seat 25 is provided to releasably engage with a toggle clamp L1 while the fulcrum seat 26 is provided to engage and carry an over-center link L2. A deformable rib 28 extends adjacent to or over the seat 26 as shown, to pass the pivot member of the link L2 and is thereafter swaged over the seat to thereby overlie and thereby to capture the link in working position.

Referring now to the link L2 and its over-center securement function, the toggle clamp L1 is carried thereby to engage the fulcrum seat 26 and to be drawn into engagement with the outer wall 17, with the link L2 moved over center with respect to the anchor seat 25. Accordingly, the toggle clamp L1 has an inner wall 29 that has coextensive interface engagement with outer wall 17 when the link L2 is over center (but slightly as shown). The toggle clamp member L1 is also an extruded cross section having a nose 30 to engage in seat 25 and a link seat 31 to engage and be carried by the link L2. A feature is the coextension of the toggle clamp L1 and of the seats 25, 26 and 31 between the end faces 21 and 22; and of the link L2 and toggle clamp L1 engagement therewith. Toggle clamp L1 is operated by a lever 32 that extends tangent from the seat 31 to have stopped engagement with the outer wall 17 when the link L2 is over center in working position and with its side members 33 in tension and in shear with its cross members 34 and 35 engaged with seats 26 and 31. Accordingly, compressive forces are applied and which are counteracted by tension forces as stress is applied internally tending to open the coupling.

Figure 16:
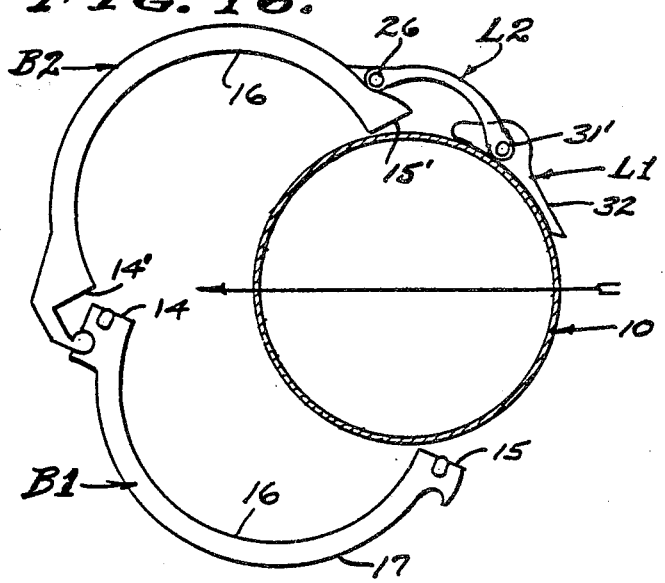
FIG. 16 is a view of a second embodiment showing the opencoupling for lateral reception of confronting tube sections.

The improved form of clam-shell coupling as it is shown in FIG. 16 and related views has all of the features of the form of FIG. 1. However, load distribution and strength is improved by multiplying the link L2 and toggle clamp L1 shear connections and applying the loads therefrom at intervals spaced longitudinally between the end faces 21 and 22 of the body members B1 and B2. The link L2 as it is shown in FIG. 1 and related views has external side members 33, and is in the nature of a bail subject to bending at the juncture of the cross members 34 and 35 with said side members. On the contrary, such bending is virtually eliminated in the link L2 of the improved form thereof now to be described.

Figure 17:
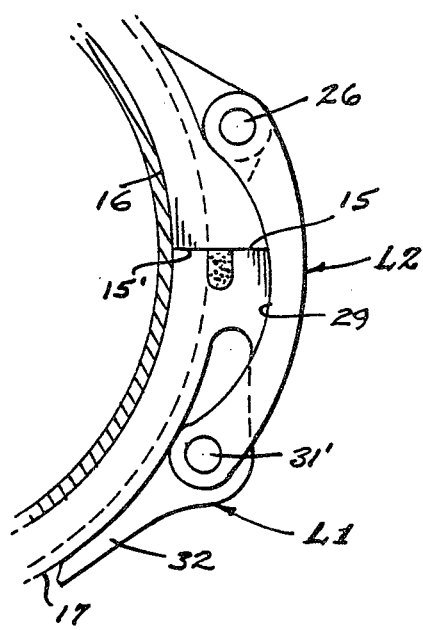
FIG. 17 is an enlarged fragmentary view of the embodiment of FIG. 16 in a closed condition.

Referring now to the improved link L2, of FIGS. 16–22 said link is advantageously made of an extrusion of arcuate cross sectional configuration adapted to extend between the fulcrum pivot pin 26 and the link pivot (pin) 31', the purpose of this shape being to enable said link to pass over and its interior wall 29 contiguously overlie and coextensively engage the convex enlargements of the body members B1 and B2 at the interface engagement of faces 15 and 15' (see FIG. 17). Accordingly, the exterior form of said body enlargements is convex and complementary to the interior form of said arcuate link L2. Furthermore, this arcuate shape is conducive to multiply shear connections with fulcrum pin 26 and link pin 31' by gang-milling the body member B1, the link L2 and the toggle clamp L1, for tongued interengagement as shown. That is, a multiplicity of mating slots 36, 37 and 38 are formed in the members B1, L2 and L1; similar to "piano hinge" members. In practice for example, three slots in one member engage with four slots in the mating member, whereby there are six shear planes (the FIG. 1 form has two shear planes). As a result, load is distributed throughout the longitudinal axial extent of the coupling bodies and strength is commensurately increased. The inner surface 29 of link L2 coextensively bears against the convex exterior of the body section abutment at 15—15', as shown in FIG. 17, so as to be in hoop tension with minimum strain on link L2 and thereby prevents distortion when tension forces are applied therethrough.

The toggle clamp L1 of the improved form of FIG. 16 is also improved, as its interior wall 29' is coextensively complementary to the exterior form of wall 17 on body member B2. The overall heft of latch L is thereby decreased without sacrificing strength. Accordingly, the toggle clamp L1 is prevented from distorting when compression forces are applied therethrough.

In accordance with the extrusion concept herein disclosed, the hinge H enlargements 14 and 14' are themselves mated, there being male and female parts 39 and 40 interengaged to form a hinge H operable within limits of angular separation. As shown, base member B1 is extruded with the female part 40 faced radially outward from axis a, while cover member B2 is extruded with the male part 39 turned radially inward from an offset extension of enlargement 14'. The male and female parts are complementary elongated formations that extend longitudinally and parallel with axis a, of semi cylindrical form 180°. In order to capture the male part 39 in operating position, the female part 40 is initially extruded with a straight side wall projecting radially and which is then swaged partially over the male part after insertion thereof into said female part and to overlie the same for limited rotation. Note that the axis of hinge H is next adjacent (tangent) to the exterior wall 17.

In accordance with this invention, the separable body members B1 and B2 are reliably sealed when in interface engagement one with the other at the aforesaid diametrical plane that is coincidental with the central axis a. In practice, there are both circumferential and longitudinal seals S1 and S2, at the bore interfaces with tubes 10, and at the interfaces 14—14' and 15—15', all integrally and permanently molded as one elastomer seal into at least one body member B1, and as separate circumferential seals into the other body member B2, or vice versa. The circumferential seals S1 are molded into channels 41 and 41' cut into the inner diameter bore 16 of the body members B1 and B2, next adjacent to the inwardly faced shoulders 19, and axially outward thereof respectively. The longitudinal seals S2 are molded into channels 42 and 42' extruded into the faces of at least one of said body members and preferably into the faces 14' and 15' of the body member B2 intermediate the counter bore 18 and outer diameter wall 17. A feature is the integral interconnection of the seals S1 and S2 as they are molded into the channels 41—41' and 42—42' of the body member B2; the seals S1 being individually molded into the channels 41 and 41' of body member B2.

The seals S1 and S2 are essentially alike in that they are depressible members projecting uniformly from the inner diameter 16 and faces 14' and 15' respectively. In carrying out this invention, the seals are pressure molded into the channels provided therefor in the body members B1 and B2, seals S1 projecting radially inward from the bore 16 and seals S2 projecting circumferentially from faces 14' and 15'. The said projecting portions of the seals simulate "O" ring seals which are highly efficient, being characterized by a semicircular cross section 44 to be depressibly engaged with the surface to be sealed, in this instance the outer diameter wall 13 of the confronting tube ends. Accordingly, the seals S1 and S2 have convexly projecting semicircular or arcuate cross sections that are depressibly engaged by the surface to be sealed, being made and/or molded of a "live" elastomer or the like that is impervious to the fluids involved. As shown in the drawings, the seals S1 and S2 are provided with grooves 43, preferably at the pressurized side thereof, in order to provide space for expansion and action of the seal. Further, as when the seal is double acting the grooves 43 is provided at both sides thereof. As shown, the projecting cross sections 44 of seals S1 are depressed against the tubing walls 10 while the seals S2 are depressed against faces 14 and 15 when the coupling is closed. The seals S1 extend across the clearance that is provided between the bore 16 and exterior wall 13 of the tubing 10. However, the faces 14 and 14', and 15 and 15' engage flat one with the other, in which case the seals S2 are initially formed or molded with a void at each side of the channel as shown in FIG. 9a, so as to accommodate displacement of the elastomer as it yields to the opposing body face against which it seals.

A feature is the continuity of the seals S1 and S2 in the body member B1, and to this end the channels 41 and 41' are in open communication with the channels 42 and 42', so that the seals S1 and S2 are integrally connected. In practice, this inter communication of channels is established by cutting the channels 41 and 41' to a greater diameter than counterbore 18, and by locating the inner sides of channels 42 and 42' radially inward of said greater diameter of channels 41 and 41' so as to be intercepted thereby. Accordingly, all body material is removed therebetween.

Another and most important feature is the scarfing and/or overlapping of seals S1 as they continue one into the other at the diametrical interfaces 14—14' and 15—15'. In practice, double scarfing is employed in the form of a "chevron" seal, or the like. As illustrated in FIGS. 10 and 11 there are variations of such seals; of chevron, halfround, ellipse, or radiused block formation, and preferably of flat sided "V" configuration known as a chevron seal. Accordingly, the seals are male and female formations at the interface plane of engagement between the body members B1 and B2, comprised of a male projection 45 of seal S1 from the planes of faces 14 and 15 of body member B1, and of a female recess 46 of seal S1 from the planes of faces 14' and 15' of body member B2. The projection 45 and recess 46 are complementary "V" formations with the vortex edge thereof disposed radially. Note that the female recess 46 is formed within the confines of embracing channel walls, and that the male projection 45 is at least as large as the female recess, or slightly larger, and to the end that the male projection is compressed and fills all interstices in the female recess when the coupling is closed, thereby ensuring fluid tightness under working conditions.

Figure 13:
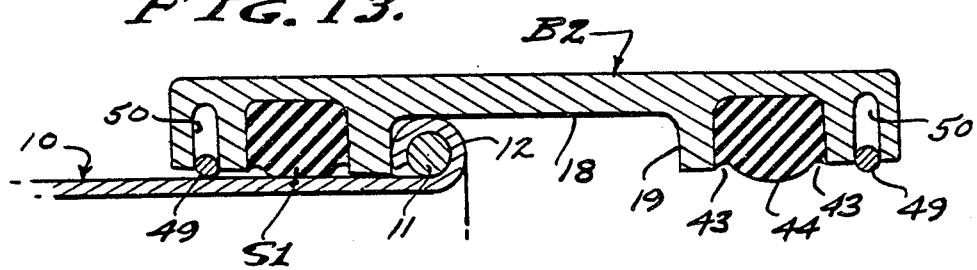
FIGS. 13 and 14 are enlarged detailed sectional views taken as indicated by lines 13—13 and 14—14 on FIG. 12 and showing first and second forms of electrical bond and a second form of secondary securement.
Figure 14:
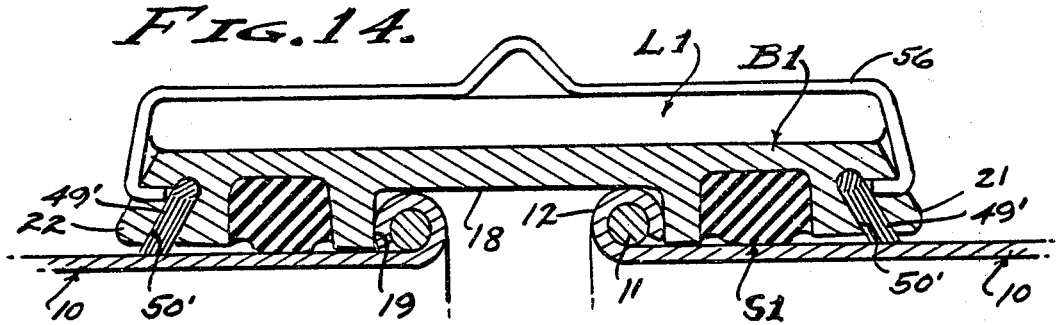

In accordance with electrical requirments, this clamshell coupling is electrically bonded to the confronting tube sections by means of brush means E. In practice, circumferentially coextensive brush segments 49 are carried in semicircular segments by channels 50 cut into the inner diameter bore 16 of body members B1 and B2, next adjacent to the aforementioned channels 41 and 41', and axially outward thereof respectively. As shown in FIG. 12 and related views, the brush segments 49 are metal wire of waved serpentine configuration with outward convolutions staked into the channels 50, and with inward convolutions projecting radially (FIG. 13) inward from bore 16 and depressibly engageable with the outer diameter walls of confronting tube sections 10. As shown in FIG. 14 and related views, the brush segments 49' are of bristle configuration angularly disposed with respect to the diametrical plane from which they project inwardly from the channels 50' in which they are anchored. In this latter preferred form the brush 49' is comprised of individual bristles of fibers or the like, each bent as beam within their yield stress; said fibers being efficient electrical conductors and packed so as to exclude debris from entry into the seal area of the coupling. Equivalent electrical contactors and/or secondary seals are contemplated, and carried by channels 50 and 51' for engagement between the coupling body members and confronting tube sections.

In accordance with this invention, the effectiveness of the scarfed engagement of seals S1 is further improved as shown in FIG. 11, by augmenting the chevron configuration thereof. In practice, the intervening wall between channels 41' and 50 and between channels 41 and 51 are removed a short distance from the faces 14-15 and 14'-15'. This permits a wider and more effective chevron interengagement.

Figure 15:
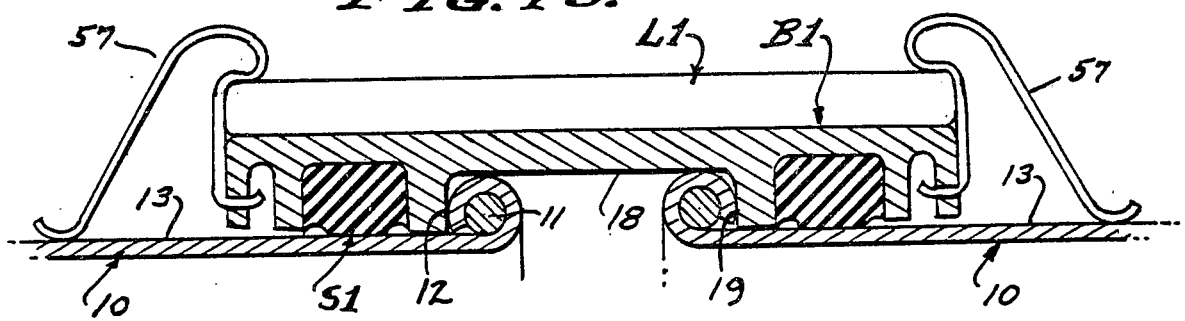
FIG. 15 is a view similar thereto and showing a third form of secondary securement.

A secondary lock means is most often a requirement, as it is universally done in aircraft installations. For example, the conventional "lockwire" 55 shown through the toggle clamp L1 and body B1. In accordance with a second form of this invention there is a bail 56 as shown in FIG. 14 that yields to the working position of and snaps over the toggle clamp L1, said bail being pivoted by inturned ends thereof entered into aligned openings at the opposite ends 21 and 22 of the body member B2. A third form of secondary lock is shown in FIG. 15 wherein a spring clip 57 is applied to hook beneath the body member B1 and simultaneously embrace the toggle clamp L1, and being biased in said condition by a leaf spring extension thereof pressed against the outer wall 13 of the tube 10.

From the foregoing, it will be seen that I have provided a coupling wherein the structural members are primarily in tension applied without distortion. Only the toggle clamp L1 the latch means enlargements of the body members are in compression; short coupled structures well adapted to compression without distortion. The pin connections of latch means L are in shear and strength thereof increased and load thereof distributed uniformly by means of multiplying the planes of shear. A dominant feature is the contiguous engagement of link and toggle members L2 and L1 with the body parts that they overly, the link L2 automatically locking in an over-center position and operating in tension without distortion as it is backed up by the complementary underlying parts of the body members. The seals S1 are depressed into engagement with the tubing walls, while the seals S2 are depressed into engagement with one of the body faces at the median plane of interface engagement therebetween. The seals S1 and S2 act as "O" ring seals, modified only as they are molded into the body members B1 and B2. The coupling is bonded (49) electrically and brush 49' additionally seals against debris. Security is by secondary lock means, wire, bail of clip. This coupling is a self contained device, adapted to be offered up to and applied laterally over the confronting tube ends, and separation forces are received axially through the "bead-over-wire" treatment of the tube ends as said forces are transferred by the body shoulders opposed to said beads to engage the 270° tangent thereof.

Having described only a typical preferred form and application of our invention, I do not wish to be limited or restricted to the specific details herein set forth, but wish to reserve to myself any modifications or variations that may appear to those skilled in the art as set forth within the limits of the following claims;

I claim:

1. A split coupling of clam-shell configuration for sealed lateral application over the radially beaded open end of a tube section, and including;
   a pair of segmental body members separable at a diametrically disposed plane coincidental with a central longitudinal axis and at which plane opposite side faces of the body members have abutted interface engagement,
   a longitudinal bore concentric with said axis and extending through the pair of body members to open at one end thereof for the reception of an end portion of the tube section,
   a counterbore in the body members and of greater diameter than the longitudinal bore to receive the radial tube section bead and extending to an inwardly disposed shoulder engageable with the radial tube section bead thereby to prevent separation of the tube section therefrom,
   one side of the body members being joined by hinge means,
   the other side of the body members being releasably joined by latch means comprised of longitudinally disposed concaved seats formed in radial enlargements outward of the abutted interface engagement at said other side of the body members respectively, a link rotatively carried by one body member and contiguously engageable over the radial enlargements of said body members, and a toggle clamp rotatively carried by the link and releasably engaged with a seat in said other body member,
   a circumferential seal carried at said one end of the body members and comprised of depressible segments projecting radially inward from the bore of each body member to engage with the outer diameter wall of a tube section extending therethrough, said seal segments having male and female formation and at least one of which extends circumferentially from the abutted side interface engagement of said body members for reception one within the other,
   and a longitudinal seal carried at each abutted interface engagement of the opposite side faces of said body members and comprised of a depressible section projecting from the side face of one body member to engage with the side face of the other body member at said abutted interface engagement thereof and extending from the circumferential seal segments at the one end of the body members.

2. The clam-shell coupling for sealed engagement with beaded tube as set forth in claim 1, wherein said radial enlargements are convexly formed outward of the abutted interface engagement at said other side of the body members respectively, and wherein the latch means link has a concaved interior contiguously engageable over the convex radial enlargements of said body members.

3. The clam-shell coupling for sealed engagement with beaded tube as set forth in claim 1, wherein the other body member has a convex exterior and wherein the toggle clamp has a concaved interior contiguously engageable over the convex exterior of said other body member and rotatively carried by the link and releasably engaged with the seat in said other body member.

4. The clam-shell coupling for sealed engagement with beaded tube as set forth in claim 1, wherein said radial enlargements are convexly formed outwardly of the abutted interface engagement at said other side of the body members respectively, wherein the other body member has a convex exterior, wherein the latch link has a concaved interior contiguously engageable over the convex radial enlargements of said body member, and wherein the toggle clamp has a concaved interior contiguously engageable over the convex exterior of said other body member and rotatively carried by the link and releasably engaged with the seat in said other body member.

5. The clam-shell coupling for sealed engagement with beaded tube as set forth in claim 1, wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link overlying the said body member enlargements and pivotally carried by said first pin from said one body member and a second longitudinally disposed pin carried thereby, and the toggle clamp pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform load distribution and increased strength.

6. The clam-shell coupling for sealed engagement with beaded tube as set forth in claim 1, wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link contiguously engageable with and overlying the said body member enlargements and pivotally carried by said first pin from said one body member and a second longitudinally disposed pin carried thereby, and the toggle clamp pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform load distribution and increased strength.

7. The clam-shell coupling for sealed engagement with beaded tube as set forth in claim 1, wherein said radial enlargements are convexly formed outward of the abutted interface engagement at said other side of the body members respectively, and wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link having a concaved interior contiguously engageable with and overlying the said convex body member enlargements and pivotally carried by said first pin from said one body member and a second longitudinally disposed pin carried thereby, and the toggle clamp pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform distribution and increased strength.

8. The clam-shell coupling for sealed engagement with beaded tube as set forth in claim 1, wherein the other body member has a convex exterior and wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link contiguously engageable with and overlying the said body member enlargements and pivotally carried by said first pin from said one body member and a second longitudinally disposed pin carried thereby, and the toggle clamp having a concaved interior contiguously engageable over the convex exterior of said other body member and pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform load distribution and increased strength.

9. The clam-shell coupling for sealed engagement with beaded tube as set forth in claim 1, wherein the other body member has a convex exterior and wherein said radial enlargements are convexly formed outward of the abutted interface engagement at said other side of the body members respectively, and wherein the latch means comprises a first longitudinally disposed pin carried by the radial enlargement of one body member, a longitudinally disposed concaved seat formed in a radial enlargement of the other body member, said radial enlargements being outward of the abutted interface engagement at said other side of the body members respectively, the link having a concaved interior contiguously engageable with and overlying the said convex body member enlargements and pivotally carried by said first pin from said one body member and a second longitudinally disposed pin carried thereby, and the toggle clamp having a concaved interior contiguously engageable over the convex exterior of said other body member and pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform distribution and increased strength.

10. The clam-shell coupling for sealed engagement with beaded tube as set forth in any one of claims 5 through 9, wherein the cross sectional contours of the body members and the link and toggle clamp members are extruded integrally formed sections respectively.

11. A split coupling of clam-shell configuration for sealed lateral application over the radially beaded open ends of confronting tube sections, and including:
   a pair of segmental body members separable at a diametrically disposed plane coincidental with a central longitudinal axis and at which plane opposite side faces of the body members have abutted interface engagement,
   a longitudinal bore concentric with said axis and extending through the pair of body members to open at opposite ends thereof for the reception of confronting end portions of the tube sections,
   a counterbore intermediate the opposite ends of the body members and of greater diameter than the longitudinal bore to receive the radial tube section beads and extending between inwardly opposed shoulders engageable with the radial tube section beads thereby to prevent separation of the confronting tube sections, one side of the body members being joined by hinge means, the other side of the body members being releasably joined by latch means comprised of longitudinally disposed concaved seats formed in radial enlargements outward of the abutted interface engagement at said other side of the body members respectively, a link rotatively carried by one body member and contiguously engageable over the radial enlargements of said body members, and a toggle clamp carried by the link and releasably engaged with the seat in the other body member, a circumferential seal carried at each opposite end of the body members and comprised of depressible segments projecting radially inward from the bore of each body member to engage with the outer diameter wall of a tube section extending therethrough, said seal segments having male and female formations and at least one of which extends circumferentially from the abutted side interface engagement of said body members for reception one within the other, and a longitudinal seal carried at each abutted interface engagement of the opposite side faces of said body members and comprised of a depressible section projecting from the side face of one body member to engage with the side face of the other body member at said abutted interface engagement thereof and extending between the circumferential seals at opposite ends of the body members.

12. The clam-shell coupling for sealed engagement with beaded tubes as set forth in claim 11, wherein said radial enlargements are convexly formed outward of the abutted interface engagement at said other side of the body members respectively, and wherein the latch means links is rotatively carried by one body member and contiguously engageable over the radial enlargements of said body members, and the toggle clamp rotatively carried by the link and releasably engaged with the seat in said other body member.

13. The clam-shell coupling for sealed engagement with beaded tubes as set forth in claim 11, wherein said radial enlargements are convexly formed outward of the abutted interface engagement at said other side of the body members respectively, and wherein the latch means link is rotatively carried by one body member and having a concaved interior contiguously engageable over the convex radial enlargements of said body members, and the toggle clamp rotatively carried by the link and releasably engaged with the seat in said other body member.

14. The clam-shell coupling for sealed engagement with beaded tubes as set forth in claim 11, wherein the other body member has a convex exterior and wherein radial enlargements are formed outward of the abutted interface engagement at said other side of the body members respectively, and wherein the latch means link is rotatively carried by one body member and contiguously engageable over the radial enlargements of said body members, and the toggle clamp having a concaved interior contiguously engageable over the convex exterior of said other body member and rotatively carried by the link and releasably engaged with the seat in said other body member.

15. The clam-shell coupling for sealed engagement with beaded tubes as set forth in claim 11, wherein said radial enlargements are convexly formed outwardly of the abutted interface engagement at said other side of the body members respectively, wherein the other body member has a convex exterior, wherein the latch link has a concaved interior contiguously engageable over the convex radial enlargements of said body members, and wherein the toggle clamp has a concaved interior contiguously engageable over the convex exterior of said of said other body member and rotatively carried by the link and releasably engaged with the seat in said other body member.

16. The clam-shell coupling for sealed engagement with beaded tubes as set forth in claim 11, wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link overlying the said body member enlargements and pivotally carried by said first pin from said one body member and a second longitudinally disposed pin carried thereby, and the toggle clamp pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform load distribution and increased strength.

17. The clam-shell coupling for sealed engagement with beaded tubes as set forth in claim 11, wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link contiguously engageable with and overlying the said body member enlargements and pivotally carried by said first pin from said one body member and a second longitudinally disposed pin carried thereby, and the toggle clamp pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform load distribution and increased strength.

18. The clam-shell coupling for sealed engagement with beaded tubes as set forth in claim 11, wherein said radial enlargements are convexly formed outward of the abutted interface engagement at said other side of the body members respectively, and wherein the latch means comprises a first longitudinally disposed pin carried by the radial enlargement of one body member, a longitudinally disposed concaved seat formed in a radial enlargement of the other body member, said radial enlargements being outward of the abutted interface engagement at said other side of the body members respectively, the link having a concaved interior contiguously engageable with and overlying the said convex body member enlargements and pivotally carried by said first pin from said one body member and a second longitudinally disposed pin carried thereby, and the toggle clamp pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform distribution and increased strength.

19. The clam-shell coupling for sealed engagement with beaded tubes as set forth in claim 11, wherein the other body member has a convex exterior and wherein the latch means comprises a first longitudinally disposed pin carried by the radial enlargement of one body member, a longitudinally disposed concaved seat formed in the radial enlargement of the other body member, said radial enlargements being outward of the abutted interface engagement at said other side of the body members respectively, the link contiguously engageable with and overlying the said body member enlargements and pivotally carried by said first pin from said one body member and a second longitudinally disposed pin carried thereby, and the toggle clamp having a concaved interior contiguously engageable over the convex exterior of said other body member and pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform load distribution and increased strength.

20. The clam-shell coupling for sealed engagement with beaded tubes as set forth in claim 11, wherein the other body member has a convex exterior and wherein said radial enlargements are convexly formed outward of the abutted interface engagement at said other side of the body members respectively, and wherein the latch means comprises a first longitudinally disposed pin carried by the radial enlargement of one body member, a longitudinally disposed concaved seat formed in a radial enlargement of the other body member, said radial enlargements being outward of the abutted interface engagement at said other side of the body members respectively, the link having a concaved interior contiguously engageable with and overlying the said convex body member enlargements and pivotally carried by said first pin from said one body member and a second longitudinally disposed pin carried thereby, and the toggle clamp having a concaved interior contiguously engageable over the convex exterior of said other body member and pivotally carried by said second pin and having a longitudinally disposed convex nose releasably engaged with the seat in the other body member, the body member enlargements and the link and the toggle clamp being slotted at each of said pins for mating tongued interengagement and thereby establishing multiple shear planes for uniform distribution and increased strength.

21. The clam-shell coupling for sealed engagement with beaded tube as set forth in anyone of claims 16, 17, 18, 19 or 20, wherein the cross sectional contours of the body member and the link and toggle clamp members are extruded integrally formed sections respectively.

* * * * *